United States Patent [19]
Jefferts

[11] Patent Number: 4,753,193
[45] Date of Patent: Jun. 28, 1988

[54] METHOD FOR TAGGING MACRO-ORGANISMS AND AN APPARATUS USED IN PERFORMING THE METHOD

[75] Inventor: Keith B. Jefferts, Shaw Island, Wash.

[73] Assignee: Northwest Marine Technology, Inc., Shaw Island, Wash.

[21] Appl. No.: 12,022

[22] Filed: Feb. 9, 1987

[51] Int. Cl.⁴ .................................................. G09F 3/00
[52] U.S. Cl. ........................................... 119/3; 40/300
[58] Field of Search ....................... 119/3; 40/300, 316; 128/330; 235/487, 494, 490

[56] References Cited

U.S. PATENT DOCUMENTS

| | | | |
|---|---|---|---|
| 3,128,744 | 4/1964 | Jefferts | 119/3 |
| 3,313,301 | 4/1967 | Jefferts | 128/330 |
| 3,545,405 | 12/1970 | Jefferts | 119/3 |
| 3,820,545 | 6/1974 | Jefferts | 128/330 |
| 4,233,964 | 11/1980 | Jefferts | 119/3 X |
| 4,449,042 | 5/1984 | Hampson et al. | 235/494 X |

FOREIGN PATENT DOCUMENTS 2523531 12/1975 Fed. Rep. of Germany ......... 40/316
903715 10/1945 France ............................... 40/316

Primary Examiner—Robert P. Swiatek
Attorney, Agent, or Firm—Kenyon & Kenyon

[57] ABSTRACT

In a method for tagging members of a large homogenous group of macro-organisms so that each macro-organism is assigned to a respective one of a plurality of statistically equivalent subgroups, successive segments of wire are cut from a continuous length of wire indelibly marked along the length thereof with a plurality of identification codes at least equal in number to the members of the large homogenous group to be tagged. Each identification code includes a plurality of longitudinally extending multidigit binary words and a circumferentially extending multidigit binary word. The circumferentially extending binary word in any identification code has one of a plurality of different values, each of the values occurring in a number of the identification codes substantially equal to the total number of macro-organisms divided by the number of the subgroups. The different values of the subgroup identification word follow one another along the length of the wire in a pre-established repeating sequence or randomly.

20 Claims, 1 Drawing Sheet

METHOD FOR TAGGING MACRO-ORGANISMS AND AN APPARATUS USED IN PERFORMING THE METHOD

BACKGROUND OF THE INVENTION

This invention relates to a method for tagging macro-organisms and to an apparatus used in the performance of that method. More particularly, this invention relates to a method for tagging members of a large homogenous group of macro-organisms so that each macro-organism is assigned to a respective one of a plurality of statisically equivalent subgroups.

U.S. Pat. Nos. 3,128,744 and 3,313,301 to Jefferts et al. describe a method for investigating the migration and related physiological characteristics of macro-organisms existing individually or in groups. In those patents, a procedure is set forth wherein fish are tagged internally with small magnetically detectable particles carrying coded identification and information marks and released in their normal environment. The tagged organisms are subsequently recovered by passing a mass of captured organisms through a deflector gate mechanism operated under the control of a magnetic detector device.

Pursuant to the teachings of U.S. Pat. No. 3,545,405 to Jefferts, an identifying tag usable in the above-described method comprises a small metallic body of cylindrical shape cut from a continuous length of wire. The surface of the identifying tag contains along the circumference thereof binary coded information in the form of a plurality of minute indentations arranged in a predetermined pattern.

U.S. Pat. No. 3,820,545 to Jefferts discloses a method and apparatus for implanting identifying tags of the above-described type into macro-organisms so that movement of the macro-organisms from one habitat to another may be studied. In accordance with the disclosed method, the supply of wire is incrementally advanced along a substantially straight path through a cutting and implanting device which severs from the length of wire a short segment suitable for implantation. The implanting portion of the device includes a reciprocating hypodermic needle through which the cut wire segment is advanced by the supply of wire and implanted in the macroorganism.

In accordance with conventional tagging techniques, identifying tags of the kind described in U.S. Pat. No. 3,545,405 are "batch-coded," i.e., produced in groups ranging in size from 500 tags to 500,000 tags, with all tags in a respective group carrying the same identifying number or code. A current data format uses four words of binary data on the surface of the wire, each such word having seven binary digits spaced from one another longitudinally along the length of the wire. The separate words are circumferentially spaced from one another. One of the four words, referred to as the "master word," serves only to provide an indicator for the starting point and direction of reading for the remaining three words. Each of those remaining three words is commonly organized as six binary digits and one error check binary digit (parity bit).

Coded wire tags are manufactured and sold in wire form. Identification codes each somewhat shorter than the eventual tags are marked one after another down the length of the wire. The cutting and implanting device severs one tag from the end of the spool of wire during each machine cycle and each such severed tag is longer than one identification code. The usual tag is approximately 1.2 identification code groups in length. In batch coding, the extra length assures ease of reading of the tags even if the cutting operation distorts significant amounts of the tag ends. The reader simply begins at the starting point indicated by the master word, reads to the end of the tag in the direction indicated, then moves to the opposite end of the tag, and continues reading. This method of preparing and subsequently reading batch-coded tags is possible because all the tags are identical: the two ends of each tag carry fragments of the same identification code.

Many circumstances exist where random or pseudo-random assignment of an individual to one of a few statistically equivalent subgroups, as well as to the primary group is desired. For example, it may be desired to tag 100,000 fish with nominally identical tags, each fish being additionally assigned to one of five statistically equivalent subgroups.

A solution to this problem is to provide an additional subgroup number on the tags in the usual lengthwise fashion. However, if those tags are cut so that the data fields begin more or less in the middle of the tags, the subgroup identification codes associated with some tags are ambiguous inasmuch as the ends of each such tag are marked with parts different codes. The essence of the problem is that when more than one digit changes between adjacent tags, seriously ambiguous results may appear in the cutting and reading operations.

An object of the present invention is to provide a method of the above-described type for tagging members of a large homogenous group of macro-organisms so that each macro-organism is assigned to a respective one of a plurality of statistically equivalent subgroups without the afore-mentioned ambiguity in the cutting and reading operations.

Another, concomitant, object of the present invention is to provide an improved method of coding identification tags to facilitate the tagging of members of statistically equivalent subgroups of a primary group of macro-organisms.

Another, more particular, object of the present invention is to provide for use in an improved method of tagging, a wire marked with a succession of identification codes each having a word identifying a respective subgroup.

SUMMARY OF THE INVENTION

A method for tagging members of a large homogenous group of macro-organisms so that each macro-organism is assigned to a respective one of a plurality of statistically equivalent subgroups comprises the step of providing a continuous length of wire indelibly marked along the length thereof with a plurality of identification codes at least equal in number to the members of the large homogenous group to be tagged. Each of the identification codes includes a plurality of first multi-digit binary words extending in a longitudinal direction along the wire and circumferentially spaced from one another. Such longitudinally extending binary words in any one of the identification codes along the wire are respectively identical to corresponding words in any other one of the identification codes. Each identification code further includes a second multidigit binary word extending in a circumferential direction around the wire. The circumferentially extending binary word in any one of the identification codes has one of a plurality of different values, each of those values occurring in a number of the identification codes substantially equal to the number of macro-organisms in the entire group divided by the number of the subgroups. Pursuant to another step in the method of the invention, substantially equal length segments are successively severed from the wire at one end thereof and implanted in respective macro-organisms.

The second multidigit binary word, included in each identification code, advantageously takes the place of the parity bits in identification codes heretofore utilized. Experience has shown the parity bits to be unnecessary. Accordingly, where an identification code comprises four words of binary data extending lengthwise along a wire and circumferentially spaced from one another, the subgroup identification word is a three-bit binary word, each of the three bits being aligned with a respective longitudinally extending multidigit binary word other than the master word. The fact that all three binary digits forming the subgroup identification word or "replicate word" all occur at the same axial position on the wire obviates the ambiguities discussed above. Such ambiguities essentially result from cutting the codes apart in the middle thereof. Pursuant to the method of the instant invention, the subgroup identification word is never disassembled in the cutting process.

Pursuant to another particular feature of the present invention, the different values of the second multidigit binary word follow each other along the wire in a preestablished repeating sequence. Preferably, each set of adjacent identification codes along the wire equal in number to the total number of macro-organisms divided by the number of subgroups includes exactly one of each value of the second multidigit binary word. Alternatively, the different values can follow each other along the wire in a random sequence.

DETAILED DESCRIPTION

Figure 1:
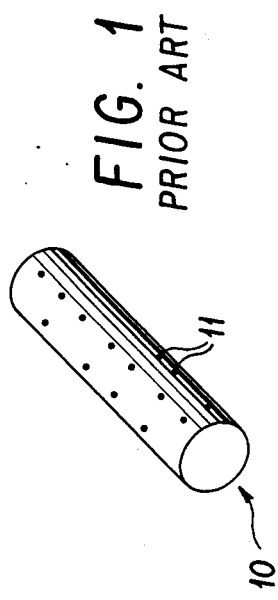
FIG. 1 is a perspective view of a prior art identifying tag.

As illustrated in FIG. 1, an identifying tag 10 for implantation into a macro-organism such as a fish comprises a small segment of wire measuring approximately 0.010 of an inch in diameter and 0.040 of an inch in length. The material of the identifying tag is preferred to be a type 302 stainless steel which has the requisite magnetic characteristics for detection upon recovery of the host organism. Contained along the surface of the wire segment and arranged in a predetermined pattern is coded binary information enabling a biologist to identify the tag and thus to determine the movements of the organism in which the tag had been implanted. Each "high-level" binary bit is in the form of a spot or indentation formed preferably by focusing a laser pulse or electrical discharge on the surface of the wire, as indicated at 11 in FIG. 1. The binary markings 11 are permanent, and may be imparted on the surface of the wire tag by other methods, as set forth in U.S. Pat. No. 3,545,405, the disclosure of which is incorporated by reference herein.

A multiplicity of identifying tags similar to tag 10 in FIG. 1 are cut successively from a length of wire, as discussed in U.S. Pat. No. 3,820,545 and in copending Application Ser. No. 916,165 filed Oct. 7, 1986, now U.S. Pat. No. 4,679,559, and entitled "Method and Device for Tagging a Macro-Organism." The disclosures of that patent and that application are also incorporated by reference herein.

Figure 2:
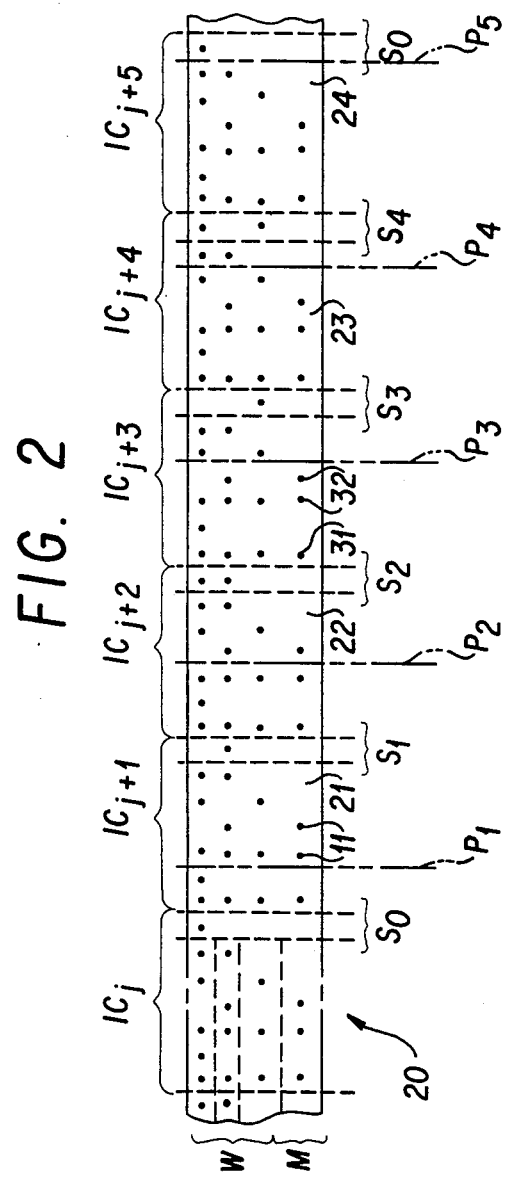
FIG. 2 is a projection onto a planar surface of a cylindrical surface of a wire provided with a sequence of identification codes and used in a method in accordance with the present invention.

As illustrated in FIG. 2, a wire 20 from which tag 10 is cut is provided on an external surface with a succession of identification codes $IC_j$, $IC_{j+1}$, $IC_{j+2}$. . . . Each identification code $IC_j$, where $j = 1, 2, 3, \ldots$, includes a plurality of first multidigit binary words W each comprising six binary digits with a high logic level represented by a mark or indentation 11 in the surface of wire 20. Each binary word W extends in a longitudinal direction along the length of wire 20 and is identical to a corresponding word in any other identification code on wire 20. A master word M, for identifying the beginning of words W and for indicating the direction of reading thereof along the length of wire 20, is included in each identification code $IC_j$, $j = 1, 2, 3, \ldots$, and likewise extends longitudinally along wire 20. Master word M also consists of six binary digits with high levels represented by marks or indentations in the surface of wire 20. The marks or indentations may be formed in the wire surface in accordance with the teachings of U.S. Pat. No. 3,545,405.

Each identification code $IC_j$, $IC_{j+1}$, $IC_{j+2}$ . . . further includes another multidigit binary word $S_0$, $S_1$, $S_2$ . . . whose binary digits are spaced circumferentially from each other about wire 20. Whereas words W and M are identical for all identification codes $IC_j$, $j = 1, 2, 3 \ldots$, the identification codes of each set of five contiguous codes $IC_j$-$IC_{j+4}$ have respective second or circumferentially extending multidigit binary words $S_0$-$S_4$ of differing numerical values.

Circumferentially extending binary words $S_0$-$S_4$ are intended to identify respective statistically equivalent subgroups of a large homogenous group of macro-organisms. Preferably, the members of any group of five contiguous identification codes along wire 20 are provided with the same subgroup identification words $S_0$-$S_4$ as corresponding members of adjacent sets of five identification codes. Accordingly, the different values $S_0$-$S_4$ of the subgroup identification word follow each other along the wire in a pre-established repeating sequence. Where the subgroup identification word has three digits, up to eight subgroups may be divided out of the homogenous population.

As shown in the drawing, it is possible that during a cutting and implanting operation, wire 20 may be severed along a plurality of transverse lines or planes $P_{j+1}$, $P_{j+4}$ and $P_{j+5}$ within the areas of respective identification codes $IC_{j+1}$, $IC_{j+2}$, $IC_{j+3}$, $IC_{j+4}$, $IC_{j+5}$. Resulting tags 21, 22, 23 and 24 each contain a respective subgroup identification word $S_1$-$S_4$, which has remained intact and unaffected by the cutting operation, and four longitudinally extending multidigit binary words W and M each having the same digit repeated at the front and rear ends of the respective identifying tag 21-24. One or more of the tags 21-24 may be damaged at one or the other end during the cutting operation so that the repeated bits at the damaged ends are obliterated. In any event, enough information has survived the cutting process to completely identify the group and subgroup to which each organism belongs.

As described in U.S. Pat. No. 3,820,545, the severed tags are successively implanted in the body tissues of respective host macro-organisms. Subsequently, when a host organism has been captured and the implanted tag removed, a research biologist locates a solitary mark 31 in the master word M of the recovered tag and reads the tag longitudinally away from the solitary mark 31 in a direction proceeding from the solitary mark through a single low-level bit and towards subsequent high-level bits 32. Upon coming to the end of the tag, the researcher continues reading in the same direction but from the opposite end of the tag. The subgroup identification word ($S_2$) is identified as being in a column or cylindrical area immediately adjacent the cylindrical area of start-read mark 31 on the same side thereof as three successive low-level bits in the master word.

Although the invention has been described in terms of a particular embodiment and application, one of ordinary skill in the art, in light of this teaching, can generate additional embodiments and modifications without departing from the spirit of or exceeding the scope of the claimed invention. For example, the number of longitudinally extending binary words can be greater or less than four, the number of digits in each longitudinally extending binary word and in the subgroup identification word can vary depending upon the particular application, and the sequence of values $S_0$–$S_4$ of the subgroup identification word can be random along the length of wire 20 or a pre-established repeating sequence, as illustrated in FIG. 2. Accordingly, the descriptions and illustrations herein are proffered by way of example to facilitate comprehension of the invention and should not be construed to limit the scope thereof.

What is claimed is:

1. A method for tagging members of a large homogenous group of macro-organisms so that each macro-organism is assigned to a respective one of a plurality of statistically equivalent subgroups, comprising the steps of:
   providing a continuous length of wire;
   indelibly marking said wire along the length thereof with a plurality of identification codes at least equal in number to the members of the large homogeneous group to be tagged, each of said identification codes including a plurality of first multidigit binary words extending in a longitudinal direction along said wire and circumferentially spaced from one another, the multidigit binary words in any one of said identification codes being identical to corresponding words in any other one of said identification codes, each of said identification codes further including a second multidigit binary word extending in a circumferential direction around said wire, the second multidigit binary word in any one of said identification codes having one of a plurality of different values, each of said values occurring in a number of said identification codes substantially equal to the total number of macro-organisms in said group divided by the number of said subgroups;
   successively severing substantially equal length segments from said wire at one end thereof; and
   implanting the severed segments of said wire in respective ones of said macro-organisms.

2. The method set forth in claim 1 wherein said severed segments of said wire are successively implanted in respective ones of said macro-organisms.

3. The method set forth in claim 2 wherein said identification codes are spaced from each other by a predetermined distance and said segments have a length greater than said distance, whereby at least some of said segments contain portions of adjacent ones of said identification codes.

4. The method set forth in claim 3 wherein said values follow each other along said wire in a pre-established repeating sequence.

5. The method set forth in claim 4 wherein each set of adjacent identification codes along said wire equal in number to the number of macro-organisms in said group divided by the number of said subgroups includes exactly one of every one of said values.

6. The method set forth in claim 3 wherein said values follow each other along said wire in a random sequence.

7. The method set forth in claim 3 wherein in each of said identification codes one of the first multidigit binary words indicates a beginning of each of the associated first multidigit binary words and a direction of decreasing significance of the digits in said associated first multidigit binary words.

8. A method for tagging members of large homogenous group of macro-organisms so that each macro-organism is assigned to a respective one of a plurality of statistically equivalent subgroups, comprising the steps of:
   providing a continuous length of wire indelibly marked along the length thereof with a plurality of identification codes at least equal in number to the members of the large homogeneous group to be tagged, each of said identification codes including a plurality of first multidigit binary words extending in a longitudinal direction along said wire and circumferentially spaced from one another, the multidigit binary words in any one of said identification codes being identical to corresponding words in any other one of said identification codes, each of said identification codes further including a second multidigit binary word extending in a circumferential direction around said wire, the second multidigit binary word in any one of said identification codes having one of a plurality of different values, each of said values occurring in a number of said identification codes substantially equal to the total number of macro-organisms in said group divided by the number of said subgroups;
   successively severing substantially equal length segments from said wire at one end thereof; and
   implanting the severed segments of said wire in respective ones of said macro-organisms.

9. The method set forth in claim 8 wherein said severed segments of said wire are successively implanted in respective ones of said macro-organisms.

10. The method set forth in claim 8 wherein said identification codes are spaced from each other by a predetermined distance and said segments have a length greater than said distance, whereby at least some of said segments contain portions of adjacent ones of said identification codes.

11. The method set forth in claim 10 wherein said values follow each other along said wire in a pre-established repeating sequence.

12. The method set forth in claim 11 wherein each set of adjacent identification codes along said wire equal in number to the number of macro-organisms in said group divided by the number of said subgroups includes exactly one of every one of said values.

13. The method set forth in claim 10 wherein said values follow each other along said wire in a random sequence.

14. The method set forth in claim 8 wherein in each of said identification codes one of the first multidigit binary words indicates a beginning of each of the associated first multidigit binary words and a direction of decreasing significance of the digits in said associated first multidigit binary words.

15. A wire to be cut into segments of substantially equal length for tagging members of a large homogenous group of macro-organisms so that each macro-organism is assigned to a respective one of a plurality of statistically equivalent subgroups, said wire including along the length thereof a plurality of identification codes at least equal in number to the members of the large homogeneous group to be tagged, said identification codes being indelibly marked on said wire, each of said identification codes including a plurality of first multidigit binary words extending in a longitudinal direction along said wire and circumferentially spaced from one another, the multidigit binary words in any one of said identification codes being identical to corresponding words in any other one of said identification codes, each of said identification codes further including a second multidigit binary word extending in a circumferential direction around said wire, the second multidigit binary word in any one of said identification codes having one of a plurality of different values, each of said values occurring in a number of said identification codes substantially equal to the total number of macro-organisms in said group divided by the number of said subgroups.

16. The wire set forth in claim 15 wherein said identification codes are spaced from each other by a predetermined distance and said segments have a length greater than said distance, whereby at least some of said segments contain portions of adjacent ones of said identification codes.

17. The wire set forth in claim 16 wherein said values follow each other along said wire in a pre-established repeating sequence.

18. The wire set forth in claim 17 wherein each set of adjacent identification codes along said wire equal in number to the number of macro-organisms in said group divided by the number of said subgroups includes exactly one of every one of said values.

19. The wire set forth in claim 16 wherein said values follow each other along said wire in a random sequence.

20. The wire set forth in claim 16 wherein in each of said identification codes one of the first multidigit binary words indicates a beginning of each of the associated first multidigit binary words and a direction of decreasing significance of the digits in said associated first multidigit binary words.

* * * * *